(12) United States Patent
Christenson et al.

(10) Patent No.: US 7,693,734 B2
(45) Date of Patent: Apr. 6, 2010

(54) SYSTEM AND METHOD FOR SCHEDULING CONFERENCE RESOURCES

(75) Inventors: Steven L. Christenson, Campbell, CA (US); Shamim S. Pirzada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1300 days.

(21) Appl. No.: 10/944,357

(22) Filed: Sep. 17, 2004

(65) Prior Publication Data

US 2006/0062367 A1 Mar. 23, 2006

(51) Int. Cl.
*G06F 9/46* (2006.01)
*H04L 12/16* (2006.01)
*G06F 15/173* (2006.01)

(52) U.S. Cl. .......................... 705/8; 370/261; 709/227
(58) Field of Classification Search ....................... 705/8
See application file for complete search history.

(56) References Cited

U.S. PATENT DOCUMENTS

| | | | |
|---|---|---|---|
| 5,124,912 A * | 6/1992 | Hotaling et al. ................ 705/9 |
| 5,483,587 A | 1/1996 | Hogan et al. |
| 5,491,797 A * | 2/1996 | Thompson et al. .......... 709/204 |
| 5,546,449 A | 8/1996 | Hogan et al. |
| 5,631,904 A | 5/1997 | Fitser et al. |
| 5,680,392 A | 10/1997 | Semaan |
| 5,790,974 A * | 8/1998 | Tognazzini .............. 455/456.5 |
| 5,903,637 A | 5/1999 | Hogan et al. |
| 5,963,913 A | 10/1999 | Henneuse et al. ............... 705/9 |
| 6,016,478 A | 1/2000 | Zhang et al. .................... 705/9 |
| 6,101,480 A * | 8/2000 | Conmy et al. ................... 705/9 |
| 6,205,122 B1 | 3/2001 | Sharon et al. ............... 370/254 |
| 6,282,278 B1 | 8/2001 | Doganata et al. |
| 6,324,169 B1 | 11/2001 | Roy |
| 6,324,517 B1 * | 11/2001 | Bingham et al. ................ 705/8 |

(Continued)

FOREIGN PATENT DOCUMENTS

WO WO 2004/114662 12/2004

(Continued)

OTHER PUBLICATIONS

EmergingSoft (EmergingSoft.com [online], [retrieved on Sep. 18, 2008]. Retrieved from the Internet: <URL:http://web.archive.org/web/20030801185911/http://emergingsoft.com/>).*

(Continued)

*Primary Examiner*—Jonathan G. Sterrett
*Assistant Examiner*—Peter Choi
(74) *Attorney, Agent, or Firm*—Baker Botts L.L.P.

(57) ABSTRACT

A method for scheduling conference resources is provided, that includes receiving a request for a conference reservation. The request may include the identities of a plurality of proposed participants, a proposed start time, and at least one fixed resource criterion. In accordance with a particular embodiment of the present invention, a projected location of at least one of the proposed participants is automatically calculated. The projected location may be a location at which the at least one of the proposed participants is expected to be at approximately the proposed start time. The method may also include automatically calculating a projected location of at least one invitee of the conference. In accordance with this embodiment, the projected location of the at least one invitee may be used to select an optimal one of a plurality of fixed resources, that match the at least one fixed resource criterion.

40 Claims, 2 Drawing Sheets

U.S. PATENT DOCUMENTS

| | | | |
|---|---|---|---|
| 6,377,987 | B1 | 4/2002 | Kracht ....................... 709/220 |
| 6,411,605 | B1 | 6/2002 | Vance et al. |
| 6,414,635 | B1 | 7/2002 | Stewart et al. .............. 342/457 |
| 6,480,830 | B1 | 11/2002 | Ford et al. ..................... 705/9 |
| 6,516,345 | B1 | 2/2003 | Kracht ....................... 709/220 |
| 6,614,450 | B1 | 9/2003 | Vossler ....................... 345/751 |
| 6,646,997 | B1 | 11/2003 | Baxley et al. |
| 6,754,323 | B1 | 6/2004 | Chang et al. |
| 6,876,734 | B1 | 4/2005 | Summers et al. ....... 379/202.01 |
| 6,898,569 | B1* | 5/2005 | Bansal et al. ................... 705/9 |
| 7,035,230 | B1* | 4/2006 | Shaffer et al. ............... 370/261 |
| 7,046,779 | B2* | 5/2006 | Hesse ..................... 379/202.01 |
| 7,139,722 | B2* | 11/2006 | Perrella et al. ................. 705/9 |
| 7,343,312 | B2* | 3/2008 | Capek et al. .................... 705/8 |
| 7,395,221 | B2* | 7/2008 | Doss et al. ...................... 705/9 |
| 7,437,463 | B1* | 10/2008 | Valletutti et al. ............ 709/227 |
| 2002/0085490 | A1* | 7/2002 | O'Neil ....................... 370/229 |
| 2002/0118688 | A1 | 8/2002 | Jagannathan ................ 370/410 |
| 2002/0184063 | A1* | 12/2002 | Kaufman et al. ................ 705/7 |
| 2003/0046304 | A1* | 3/2003 | Peskin et al. ............. 707/104.1 |
| 2004/0161080 | A1 | 8/2004 | Digate et al. ............ 379/88.17 |
| 2006/0045029 | A1* | 3/2006 | Ethier et al. ................ 370/260 |
| 2007/0036317 | A1 | 2/2007 | Shaffer et al. |

OTHER PUBLICATIONS

Internet Engineering Task Force (IETF) Internet Draft, "*SIP For Presence,*" J. Rosenberg (Lucent Technologies, Bell Laboratories) and H. Schulzrinne (Columbia University), http://www.alternic.org/drafts/drafts-r-s/draft-rosenberg-sip-pip-00.txt, Nov. 13, 1998.

PCT, International Search Report and Written Opinion (ISA/EPO) for PCT/US2006/027779, 15 pages, Jan. 2, 2007.

Shaffer et al. U.S. Appl. No. 11/190,778 filed Jul. 27, 2005, Communication from the United States Patent and Trademark Office dated Dec. 12, 2008.

Shaffer et al. U.S. Appl. No. 11/190,778 filed Jul. 27, 2005, Communication from the United States Patent and Trademark Office dated Jul. 27, 2009.

Cisco Systems Inc., Cisco Conference Connection, Data Sheet, Internet Publication Jun. 2003. Jun. 2003.

Latitude. Comm., "MeetingPlace Web 4.0 Secure. cost-effective web conferencing for enterprises," 2003.

* cited by examiner

SYSTEM AND METHOD FOR SCHEDULING CONFERENCE RESOURCES

TECHNICAL FIELD OF THE INVENTION

This invention relates generally to communication networks and more particularly to presence-based systems and methods for scheduling conference resources.

BACKGROUND

Scheduling and coordinating a conference(s) with multiple participants is increasingly complicated, particularly within larger organizations. Participants are often spread amongst many campuses or locations that may be separated geographically. It is particularly difficult to account for participant's travel schedules, and to accommodate those participants from different regions, states, or even countries.

Advanced technology has simplified the process somewhat, by allowing audio and/or video teleconferences. Also, information sharing via computer networks (e.g., LANs, WANs, the Internet) accommodates productive meetings in which all participants are not necessarily at the same location.

However, as travel schedules increase, organizations become more geographically diverse, and the quantity and type of equipment required to coordinate and accommodate the meeting agenda increases, conference coordination becomes more complex and demands more time and effort of the conference coordinator.

One of the more time consuming processes in finding and booking conference rooms (and/or other fixed resources) is that the user must have some knowledge of the available local resources in order to reserve conference rooms for a conference(s). This is often acceptable in one's local surroundings, but when one is traveling or trying to book resources remotely, this knowledge is not generally available.

SUMMARY OF THE INVENTION

According to the present invention, disadvantages and problems associated with scheduling conference resources may be reduced or eliminated.

In accordance with a particular embodiment of the present invention, a method for scheduling conference resources includes receiving a request for a conference reservation. The request may include the identities of a plurality of proposed participants, a proposed start time, and at least one fixed resource criterion. The method further includes automatically calculating a projected location of at least one of the proposed participants. The projected location may be a location at which the participant is expected to be at approximately the proposed start time.

In accordance with a particular embodiment, the proposed participant may be a conference coordinator. However, in alternative embodiments, the proposed participants may include, or be limited to one or more invitees of the conference.

In accordance with yet another embodiment of the present invention, a method for scheduling conference resources includes receiving a request for a conference reservation. The request may include a plurality of conference resources, and a proposed start time. A respective projected location for each of the plurality of conference resources may automatically be calculated. The method also includes generating an optimal location for the conference, based upon the locations of the plurality of conference resources.

Technical advantages of particular embodiments of the present invention include a system and method for scheduling conference resources that considers relative location information for one or more proposed participants of the conference. Accordingly, fixed conference resources (e.g., conference room(s)) may be scheduled according to a projected location of one or more participants.

Another technical advantage of particular embodiments of the present invention includes a system and method for scheduling conference resources that takes into account relative location information of both fixed and moveable conference resources, that may be desired for a particular conference. Accordingly, fixed and/or moveable resources may be identified and/or reserved for a conference, in a manner that accommodates the most efficient allocation of such fixed and moveable resources.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

The teachings of the present invention provide a system and method for scheduling conference resources that monitors, tracks, and/or maintains information related to actual and projected locations of proposed participants, fixed conference resources, and/or moveable conference resources. Thus, the teachings of the present invention provide an efficient method for the allocation and scheduling of conference resources, in a manner that accommodates an efficient allocation of such resources, and minimizes inconvenience to conference participants. Furthermore, the teachings of the present invention minimize the burden, time and/or resources required of a conference coordinator, in scheduling, coordinating, and/or participating in such conferences.

Figure 1:
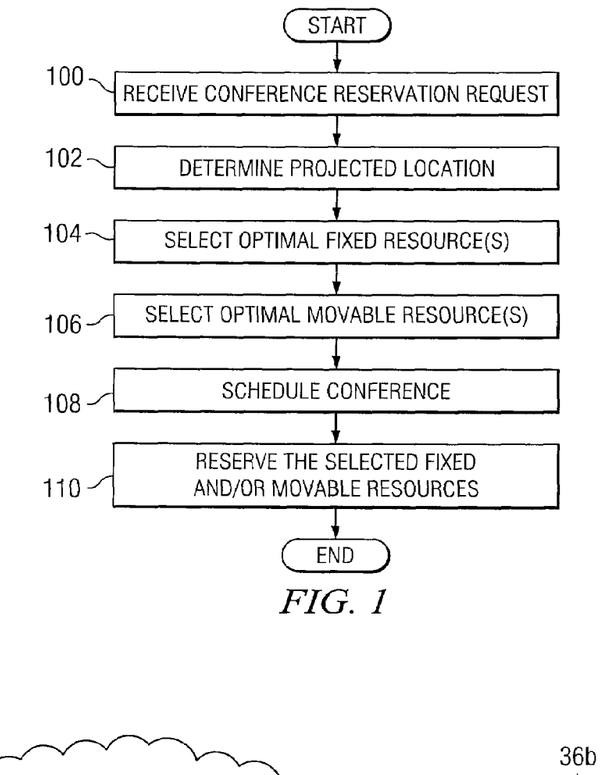
FIG. 1 illustrates an example method for presence-based scheduling of conference resources in a communication network.

FIG. 1 illustrates a method for scheduling conference resources, in accordance with a particular embodiment of the present invention. The method begins at step 100, with the receipt of a request for a conference reservation. The request may be received through a variety of forms, for example IM, email, web, TUI, IP Phone, etc. The request may include various information regarding the conference, to allow resources to be intelligently selected, allocated, and/or reserved. For example, when an individual attempts to schedule a conference in order to secure and/or reserve associated resources, the individual will typically identify and/or select various criteria related to the conference.

For purposes of this specification, the "conference coordinator" is the individual(s) that is responsible to arrange for the meeting. In many instances, the conference coordinator will attend the conference and may be charged with running the conference, and/or setting or overseeing the agenda. However, it is not uncommon for the individual with such responsibility to delegate tasks to one or more other individuals (e.g., an administrative assistant) who may or may not attend the meeting. In such an instance, the definition of conference coordinator may include all, or a subset of the individuals responsible for arranging the conference and/or conference resources.

The conference coordinator will typically identify a proposed date and time for the conference to occur. The conference coordinator may specify the exact date and time, or may indicate that the date and time are tentative, subject to coordinating the schedules of attendees and/or availability of conference resources. In an alternative embodiment, the conference coordinator may specify a range of dates and/or times, or provide a "menu" of dates and times, to allow for coordination of attendees' schedules and/or conference resource availability.

The conference coordinator may also specify a proposed duration of the conference. The proposed duration may be an estimate of the actual amount of time that the coordinator anticipates that the conference will last. In an alternative embodiment, the proposed duration may include a maximum amount of time that the conference coordinator projects that the conference will last. The date, time, and duration of the conference allow all participants to reserve the date, time, and duration for participating in the conference, if desired. Various conference resources may also be "reserved" for the date, time, and duration of the conference.

The conference reservation request will also typically identify a plurality of proposed participants. For the purposes of this specification, the proposed participants may include the conference coordinator. The proposed participants (e.g., invitees) are "invitees" of the conference. The conference coordinator may indicate that particular proposed participants are "required" attendees, and others may be "optional" attendees. The conference resource reservation system may automatically review the electronic calendar information associated with each attendee, to determine whether each of the proposed participants appears to be available to attend the conference. In an alternative embodiment, the conference reservation system may notify the conference coordinator that one or more proposed participants (e.g., required participants) are not, or do not appear to be available at the proposed date and time, for the proposed duration of the conference. In yet another embodiment, the conference resource reservation system may automatically calculate a different proposed date, time, and/or proposed duration for the conference, based upon the availability of each of the proposed participants, or a subset of the proposed participants (e.g., required attendees).

The conference coordinator may also include a plurality of conference resources, within the request for a conference reservation. Conference resources may include a conference room, a particular size of conference room, a particular layout of conference room, number of chairs (e.g., corresponding to the number of proposed participants). For the purposes of this specification, conference resources may be considered "fixed" conference resources, or "movable" conference resources.

Fixed conference resources include those resources that either cannot be conveniently moved, or typically are not moved, in order to accommodate various conferences. For example, a conference room is a fixed resource, since the room cannot be moved to another location, to accommodate participants. Also, many conference resources that are considered fixed may be hardwired or integral to the conference room. Although tables and chairs can typically be moved within a limited geographic region, the size and configuration of many such tables and chairs suggests that they be classified as fixed resources. However, the teachings of the present invention contemplate that each particular resource may be classified in advance, as either fixed or movable by an administrator, based upon the ease or convenience of moving such assets.

Also, some resources may be designated as movable, but only within a certain geographic region. For example, chairs may be considered movable assets but may only be moved to rooms within a certain distance from the conference room that is selected for the conference, or within a certain floor of a particular building, or anywhere within a particular building, based upon the preferences of the administrator.

Integral fixed conference resources also include equipment for network connectivity. For example, conference rooms are typically hardwired to provide access to local networks (e.g., LAN) or the Internet. It is contemplated that certain conferences may require access to such networks for one or more of the proposed participants. Similarly, teleconference, and/or videoconference capability may be required of a particular conference.

Certain equipment for audio conferences may be considered fixed conference resources if, for example, a particular configuration of telephone is hardwired within a particular conference room, and may not be moved and/or relocated conveniently. Videoconference equipment may also be integral to a particular conference room if, for example, cameras and/or video screens are permanently (or semi-permanently) mounted in a particular room. It is contemplated however, that certain such resources may also be movable. For example, videoconference cameras and monitors may be disposed upon rollable carts, to allow at least some mobility within specific geographic, building, or floor guidelines.

Other resources that may be fixed are screens for overhead projectors, overhead projectors, ELMO projectors, and other particular and specialized computer equipment. Such computer equipment may include docking stations that allow plug and play capability for participants' laptops and/or other computing devices. Training rooms may also include a plurality of computers that are networked together, connected to a LAN, and/or hardwired to a screen, for use in presentations. In this example, such resources would likely be identified as "fixed" by the administrator.

Computer and networking capability may also be considered fixed resources, within the teachings of the present invention. For example, a conference room may be capable of a particular amount of bandwidth to a particular network, and/or equipment associated with the conference room may limit the quality of service ("QoS") that is available for the conference.

As discussed above, in accordance with a particular embodiment of the present invention, an administrator may determine beforehand whether particular conference resources are dedicated as fixed or movable. Movable resources are typically those that can be moved from room to room within a given floor, within a given building, or within a given campus. Movable assets may include chairs, tables, telephones, audio and/or videoconference equipment, computers, screens, monitors, projectors, etc.

In accordance with a particular embodiment of the present invention, a conference coordinator will not be required to identify a specific conference resource, that the conference coordinator would like to have available for the conference. For example, the conference coordinator may specify conference resource criterion, for a particular conference. In accordance with a particular embodiment, the conference coordinator may specify that the conference resource criterion for a conference room, is one that can hold up to ten participants. In this manner, the conference resource reservation system may search available resources to identify which conference rooms are available at the proposed date and time, that can accommodate ten participants. Similarly, the conference coordinator may designate a conference resource criterion as requiring videoconference capability. This would allow the conference resource reservation system to identify whether or not fixed and/or movable resources that will accommodate videoconferencing capability for the conference are available.

In alternative embodiments, the conference coordinator may identify fixed and/or movable conference resource more specifically. For example, the conference coordinator may require a specific QoS for a specific videoconference (or audio conference). In yet another embodiment, the conference coordinator may be given the opportunity to specify fixed and/or movable resources specifically by model number, manufacturer, etc. In this embodiment, it is envisioned that the conference resource reservation system may keep an inventory of all fixed and movable resources, and present a menu to the conference coordinator. In this embodiment, the conference coordinator may specifically select each piece of equipment that the conference coordinator would like available for the conference.

At step 102, the conference resource reservation system may determine the projected location(s) of one or more of the proposed participants, including the conference coordinator. This allows the conference resource reservation system to determine the likely location of one or more of the proposed participants, at or near the time of the conference. Furthermore, this allows the conference resource reservation system to more intelligently select both fixed and movable resources that are most appropriate for the conference.

In accordance with a particular embodiment of the present invention, the conference resource reservation system will determine the projected location of the conference coordinator, at or near the projected time of the conference. The conference resource reservation system may calculate the projected location using one or more of various techniques. In one embodiment, the conference resource reservation system may determine the proposed location of the conference using information in an electronic calendar of the conference coordinator. For example, if the conference coordinator has a meeting on a particular campus (e.g., San Jose campus) just prior to, or on the day of the proposed start time, the conference resource reservation system may select conference resources that are on the San Jose campus, and/or near the meeting place of the meeting prior to the proposed conference. Furthermore, if the electronic calendar of the conference coordinator is clear on the day of the conference, the conference resource reservation system may assume that the conference coordinator will be in his assigned office, just prior to the conference.

In alternative embodiments, the conference resource reservation system may use "presence" location information of the conference coordinator, to determine the proposed location. For example, if the conference coordinator uses a mobile or a cellular phone on the day of the proposed conference, the conference resource reservation system may determine the approximate location of the conference coordinator at the time that the conference coordinator used the mobile or cellular phone. In this embodiment, the conference resource reservation system may attempt to schedule the conference at or near the location at which the conference coordinator used the cellular or mobile phone.

Similarly, the conference resource reservation system may determine the location of the conference coordinator at the time that the conference coordinator is scheduling the conference on his computer, and assume that that is the location at which the conference coordinator will be just prior to the conference. Various other information may be available to the conference resource reservation system that will allow the conference resource reservation system to determine the projected location of the conference coordinator. Such technologies include the location at which the conference coordinator last "swiped" a security badge on a particular campus, RFID information integrated into a security badge of the conference coordinator, or the location at which the conference coordinator last used electronic equipment that was or is being tracked by the conference resource reservation system.

It should be recognized by those having ordinary skill in the art that there are a variety of ways to determine a location and/or a proposed location of an individual using presence server based technology, in accordance with the present invention. Also, the conference resource reservation system may use one or more of the techniques described above in order to determine the projected location for any number of conference participants, both required and/or optional attendees.

Next, at step 104, the conference resource reservation system uses the projected locations identified above to select optimal fixed resources. The optimal fixed resources are those that satisfy, or substantially satisfy, one or more of the conference resource criterion specified by the conference coordinator and/or administrator. For example, if the conference resource reservation system determines that the conference coordinator will be attending a meeting on the 12th floor of Building 21 of the San Jose campus, the optimal conference room may be the conference room that satisfies any criterion given by the conference coordinator (e.g., capacity of ten persons) that is nearest to the 12th floor of Building 21 of the San Jose campus. The conference resource reservation system may perform similar calculations to determine the location of other optimal fixed resources, for example fixed videoconference capability, etc.

At step 106, the conference resource reservation system may select optimal movable resources, appropriate for the conference. For example, if a particular conference room is already selected by the conference resource reservation system, the conference resource reservation system may locate movable resources that satisfy the criterion specified by the conference coordinator, and select those that are nearest to the conference room (and "available" for the conference), as "optimal" movable resources.

In accordance with yet another embodiment of the present invention, the conference resource reservation system may collect projected location information for one or more of the proposed participants, and/or all fixed and movable resources that satisfy the criterion specified by the conference coordinator, and use this information collectively to determine the optimal fixed resources to use for the conference and/or the optimal movable resources to use for the conference.

In some instances, the proposed participants, fixed resources and/or movable resources may be spread across various geographic locations. Therefore, a particular conference may require more than one conference room, and more than one of some or each fixed and/or movable resource specified. For example, if the conference resource reservation system determines that two participants will be on the Dallas campus at or near the time of a conference, the conference resource reservation system may select one conference room on the San Jose campus for use by those present on the San Jose campus, and one conference room on the Dallas campus for use by those participants that will be on the Dallas Campus. In this manner, each such conference room may require audio conference and/or videoconference capability. Furthermore, the conference resource reservation system may determine the availability of bandwidth between the locations, to accommodate the transfer of audio, video or other electronic communications between the locations. It is envisioned that the conference resource reservation system will have the ability to calculate the requirements of all fixed and movable resources based upon the information it collects, to determine precisely which, and how many (e.g., redundant) fixed and/or movable resources are required.

At step 108, the conference resource reservation system schedules the conference. Upon the establishment of the date, time, and location(s) of the conference, the conference resource reservation system will notify some or all proposed participants of the location(s) selected, and/or the fixed or movable resources to be used. In a particular embodiment of the present invention, the conference resource reservation system will first notify the conference coordinator of the date, time, duration, fixed and/or movable resources selected, to allow the conference coordinator to accept or reject the selection(s), prior to notifying the proposed participants. Alternatively, the conference resource reservation system may present the conference coordinator with a limited menu of available options for various dates, times, durations, fixed resources and/or movable resources for the conference. In yet another embodiment, the system may simply proceed with the calculated locations, resources, etc—this is especially helpful when there is an imminent conference (Meet Now) being planned. At step 110, the conference resource reservation system reserves the selected fixed and/or movable resources that are to be used for the conference.

Figure 2:
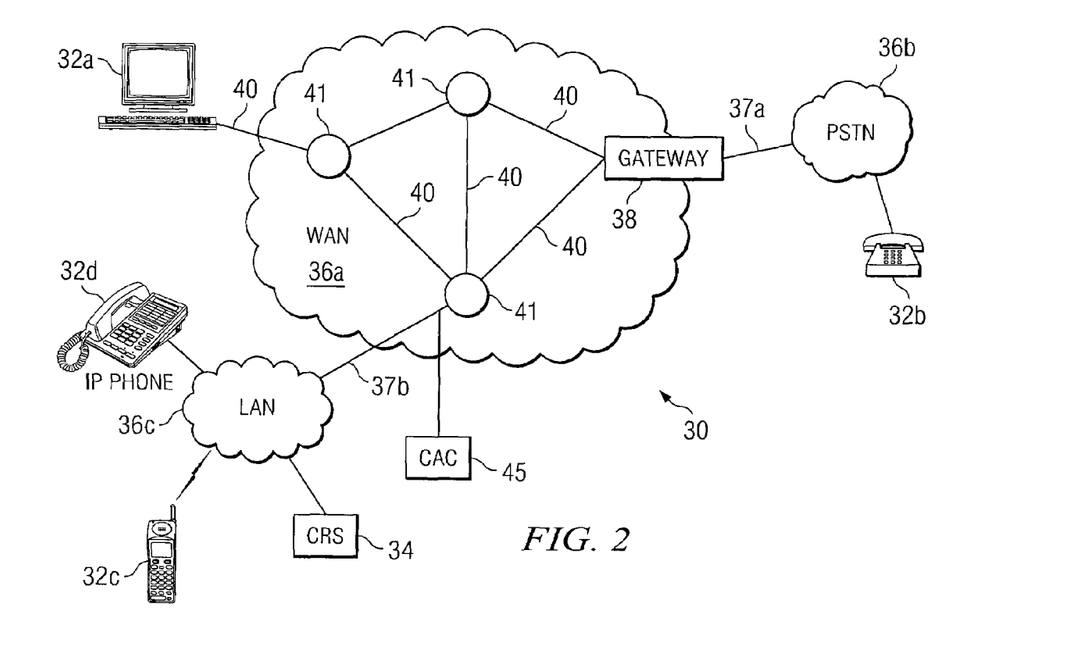
FIG. 2 illustrates an example system for scheduling of conference resources in a communication network.

FIG. 2 illustrates a communication system 30 that may be used to implement, at least in part, the functionality discussed throughout this specification. Communication 30 includes a plurality of endpoints 32a-32d (collectively, "endpoint(s) 32") having the ability to establish at least one-way communication sessions between each other and/or conference reservation system (CRS) 34, using one or more of communication networks 36a-36c. For the purposes of this specification, "conference reservation system" shall refer to any combination of hardware, software and/or embedded logic that is operable to accomplish the functionality described herein. "Calls" and "contacts" shall include requests for service transmitted using any audio and/or video means, including signals, data or messages transmitted through voice devices, text chat, web sessions, facsimile, instant messaging and e-mail. Thus, references herein to a call shall also refer to a contact and vice versa.

In the illustrated embodiment, communication network 36a is a wide area network (WAN) that enables at least one-way communication between a plurality of endpoints 32a-32d and/or CRS 34, that may be distributed across multiple cities and geographic regions. Communication network 36b is a public switched telephone network (PSTN) and couples endpoint 32b with communication network 36a through gateway 38. Communication network 36c is a local area network (LAN), which couples endpoints 32c and 32d with communication network 36a. Accordingly, users of endpoints 32a-32d and CRS 34 can establish communication sessions between and among each network component coupled for communication with one or more of networks 36a-36c. Communication links 37a and 37b couple communication networks 36a and 36b, and communication networks 36a and 36c, respectively. A call admission control (CAC) system 45 may be used to monitor the amount of bandwidth available over WAN 36a.

Communication network 36a includes a plurality of segments 40 and nodes 41 that couple endpoints 32a with CRS 34, gateway 38, and communication networks 36b-36c. Therefore, a user of endpoint 32 is provided with access to endpoints 32b-32d, and CRS 34. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, radio signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, radio signals or other portions of information (generally referred to as packets herein) between endpoints 32a-32d. Communication network 36a may include any number and combination of segments 40, nodes 41, endpoints 32a-32d, and/or CRSs 34.

In a particular embodiment, communication network 36a employs voice communication protocols that allow for the addressing or identification of endpoints, nodes, and/or CRS 34 coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, radio and/or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38.

In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, and gateway 38 are IP telephony devices, and CRS 34 may be IP enabled or "IP aware", and may include IP telephony devices and/or components. IP telephony devices have the ability of encapsulating a user's voice (or other input) into IP packets so that the voice can be transmitted over network 36a. IP telephony devices may include telephones, fax machines, computers running telephony software, nodes, gateways, or any other devices capable of performing telephony functions over an IP network.

Components of communication system 30 may utilize session initiation protocol (SIP) technology in the transmission of audio, video or other data across the system. As a result, users of endpoints 32 may be identified by components of system 30 according to a uniform reference identifier (URI), such as a user's e-mail address, or other suitable identifier so that a user may be located, monitored, tracked and/or contacted through presence detection technology. The use of presence detection by components of system 30 enable the components to capture information about various communication devices, or endpoints, available to a user and their status, such as whether a cellular phone is switched on or whether a user is logged into and/or actively using (via mouse and/or keyboard activity) a personal computer (PC). The versatility of presence enables it to be used in both IP components, such as IP phone 32d, and other, non-IP components, such as components of PSTN 36b and/or Analog Telephone Adapters. For example, gateway 38 may comprise a SIP/PSTN gateway so that components coupled to PSTN 36b may utilize features and capabilities available through SIP technology. Alternatively, gateway 38 may comprise protocols other than SIP, for example, H.323.

It will be recognized by those of ordinary skill in the art that endpoints 32a-32d, CRS 34, and/or gateway 38 may be any combination of hardware, software, and/or encoded logic that provides communication services to a user. For example, endpoints 32a-32d may include fixed or moveable conference resources, and/or network devices including a telephone, a computer running telephony software, a video monitor, a camera, an IP phone, a cell phone or any other communication hardware, software, and/or encoded logic that supports the communication of packets of media (or frames) using communication network 36a. Devices that do not directly communicate packet information can also be utilized when they are coupled with, for example, GPS tracking devices. Endpoints 32a-32d may also include unattended or automated systems, gateways, other intermediate components, or other devices that can establish media sessions. Although FIG. 1 illustrates a particular number and configuration of endpoints, CRSs 34, segments, nodes, and gateways, communication system 30 contemplates any number or arrangement of such components for communicating media.

Figure 3:
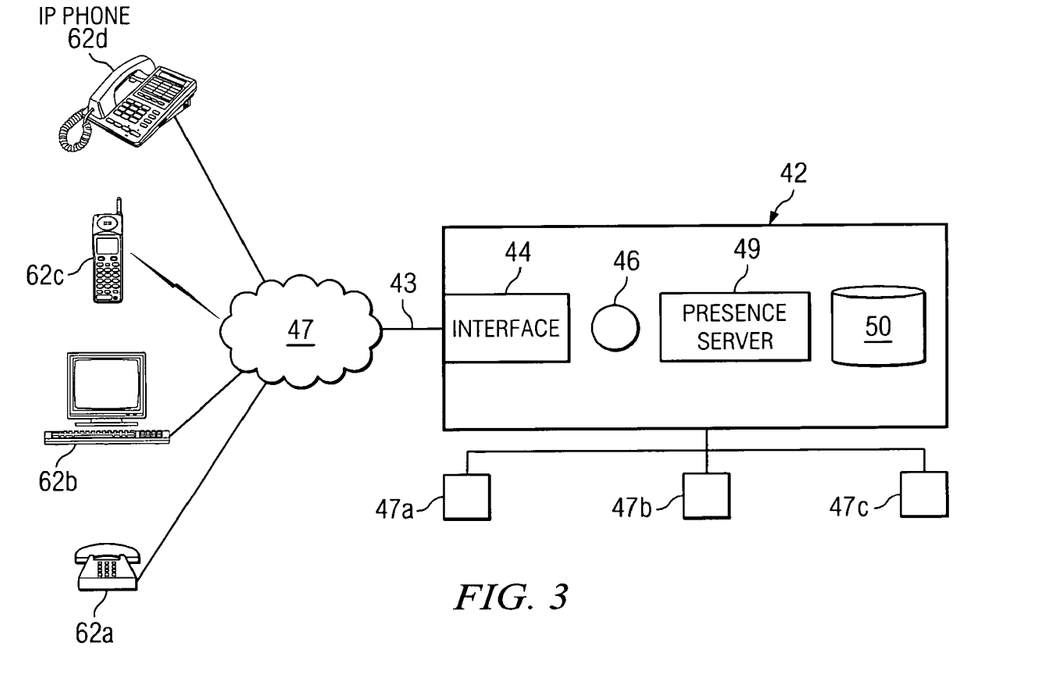
FIG. 3 illustrates a presence-based conference reservation system, in accordance with a particular embodiment of the present invention.

FIG. 3 illustrates a conference reservation system 42 in more detail, in accordance with a particular embodiment of the present invention. CRS 42 may include the same components and operate in a similar manner to CRS 42 of FIG. 2. CRS 42 includes an interface port 44 which couples CRS 42 with a communication network 47, using segment 43. Communication network 47 may comprise one or more networks such as those described with respect to communication system 30 of FIG. 2.

Endpoints 47a-47c may comprise PCs, IP phones, cell phones, radio transmitters and/or receivers, or other devices which may be used to communicate with endpoints of the network. Processor 46 may use a memory lookup, a database or other memory module, such as memory module 50, in determining electronic calendar information associated with conference invitees, determining actual or projected locations of invitees, and/or determining the location and/or functionality of conference resources. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

CRS 42 includes a presence server 49 that may be any combination of hardware, software and/or encoded logic. As further discussed below, in one embodiment presence server 49 utilizes SIP technology to detect and/or monitor the presence of conference resources and/or a particular user at an endpoint, (for example, at the user's PC, cell phone, IP phone or other device) and associate the user with a particular location. Other non-SIP presence techniques known in the art may be used in other embodiments. To accomplish such functionality, presence server 49 may have access to any relevant information relating to or associated with conference resources and/or the endpoints the user(s) utilize or access to communicate with the CRS.

CRS 42 uses processor 46 to perform computing functions and other functionality described herein. It will be recognized by those of ordinary skill in the art that CRS 42 may include any number of processors or memory modules to accomplish the functionality and features described herein. The processors 46, memory modules 50 and/or presence server 49 associated with CRS 42 may be centrally located (local) with respect to one another, or distributed throughout communication network 47.

CRS 42 may be used to locate, track, and/or compile information regarding various conference resources, and/or invitees of a conference. For example, CRS 42 may be used to track endpoints and/or conference resources within a LAN that such endpoints share with CRS 42, for example, endpoints 47a-47c. In addition, CRS 42 may communicate over a network (e.g., network 47) to identify, track, locate, and/or monitor endpoints and/or conference resources 62a-62d, that are outside of the shared LAN. Furthermore, the CRS 42 may also utilize public domain or other resources to accomplish some or all of the functions of the Presence Server 49. For example, the CRS 42 may actually determine the status of users or endpoint devices by monitoring them through a public Instant Messaging service (e.g. Yahoo, AOL IM, etc.) In a particular embodiment the present invention, CRS 42 may have access to, and/or maintain electronic calendar information of particular individuals, within an organization. Thus, CRS 42 may be used to automatically determine availability of proposed participants, and/or automatically reserve time on electronic calendars of conference invitees.

CRS 42 may also be used to identify, collect, maintain, and/or monitor information regarding various conference resources and/or network devices. For example, as described above, CRS 42 may be able to determine the amount of bandwidth available, CRS 42 may be able to determine the amount of bandwidth available between two devices, and/or achievable QoS between such devices.

CRS 42 may also be used to maintain an inventory of fixed and/or movable resources. Additional information about such conference resources may also be maintained, including various capabilities, specifications, identification numbers and/or model numbers. Since presence server 49 has the ability to track location of such resources, CRS 42 may be able to maintain updated and current location information of such conference resources. The updating of such information may be accomplished automatically with regard to devices with which CRS 42 has the ability to determine approximate location information. For example, CRS 42 may be able to identify the location of a particular device based upon the node at which it accesses the network upon boot-up or as it transacts packet transfer with non-CRS related entities. The latter is accomplished, for example, by routing or switching network components. Alternatively, or in addition to such automatic tracking, CRS 42 may also maintain information and records that are input and/or updated by hand, by a computer operator.

Communication between endpoints may include one or more voice components, text components, executable software components, data components, radio signals or other components or a combination of two or more such components. As an example and not by way of limitation, a communication between endpoints 18 may include one or more instant messages (IMs). In addition to endpoints communicating with each other using instant messaging (IM), one or more endpoints may communicate with one or more network devices using IM. One or more endpoints and network devices may support use of Session Initiation Protocol (SIP) for IM and possibly other functionality. In addition or as an alternative, one or more endpoints and network devices may support use of SIP for Instant Messaging and Presence-Leveraging Extensions (SIMPLE) Protocol. In system 30, one or more voice-enabled endpoints may support use of SIP and presence-related applications. In addition or as a further alternative, one or more endpoints and network devices may support use of Instant Messaging and Presence Protocol (IMPP) and/or SIMPLE. Reference to "IM" may encompass both IM and one or more IM-related protocols. As described below, in particular embodiments, a SIP-enabled infrastructure may be used to manage one or more network devices without the use of an additional protocol, such as CDP or SNMP.

Communication network of the present invention include an IM and presence server facilitating remote management of one or more resources coupled with or managed by communication network 30. Although IM and presence server(s) 49 is described as facilitating management of one or more conference resources and/or network devices in communication network 30, the present invention contemplates IM and presence server 49 facilitating management of one or more conference resources and/or network devices in any suitable communication network. IM and presence server 49 may interact with IM and presence clients (IMPCs) at network devices (e.g., endpoints 32 and 47) to facilitate such management. An IMPC may include one or more hardware components, software components, or embedded-logic components or a combination of two or more such components for interacting with IM and presence server 49. In particular embodiments, IM and presence server 49 may serve as a rendezvous point (which may be similar to a SIP registrar or proxy) for reporting location information regarding conference resources and/or network devices and monitoring network devices. In addition, IM and presence server 49 may provide a rendezvous service enabling one or more users to remotely locate one or more conference resources and/or network devices in communication network 30. In particular embodiments, the rendezvous service may span multiple enterprises, trust domains, or both, which may enable a first entity (such as a first enterprise or a consultant) with suitable authorization to locate one or more conference resources and/or network devices associated with one or more second entities (such as a second enterprise).

In particular embodiments, IM and presence server 49 may discover conference resources in communication network 30. As an example and not by way of limitation, in particular embodiments, after a conference resource or network device in communication network 30 boots up, an IMPC automatically communicates a publish message (which may be an IM) to IM and presence server 49 identifying the network device and/or conference resource. In particular embodiments, a conference resource or network device may be identified according to a hardware token or a software token at the conference resource or network device. In particular embodiments, because conference resources and/or network devices initiate this connection, IM and presence server 49 may detect the conference resource and/or network device through one or more firewalls or network address translations (NATs). In particular embodiments, instead of the IMPC automatically communicating a publish message to IM and presence server 49 when the network device boots up, the IMPC may communicate a publish message to IM and presence server 49 in response to a discovery request (which may be an IM) from IM and presence server 49.

In particular embodiments, IM and presence server 49 maintains presence data associated with one or more conference resources. Presence data may include one or more records that each correspond to a conference resource. A record corresponding to a conference resource may indicate a current location and/or presence status of the conference resource, which may indicate a current level of service at the conference resource. As an example and not by way of limitation, conference resources may have a current presence status of "online," "in partial service," or "offline." If a current presence status of the conference resource changes, an IMPC at the conference resource may automatically communicate an update message (which may be an IM) to IM and presence server 49 indicating the change. In response to the update message, IM and presence server 49 may update a record in memory 50 corresponding to the conference resource to indicate the change.

Various systems and methods are available for tracking location information of individuals and/or conference resources, in accordance with the teachings of the present invention. For example, conference resources may be tracked using RFID tags, that allow movement to be tracked by electronic systems. Also, system administrators and/or assistants may update and track the status of various offices, conference rooms, and/or other fixed and movable resources by hand (e.g., data entry).

In accordance with a particular embodiment of the present invention, location information for electronic components may be determined and/or tracked depending upon the network entry of the component. For example, systems currently exist that will determine the nearest attach point of a particular electronic component, e.g., phone or printer. Examples of such systems include Cisco Emergency Responder (CER) and the Cisco Enterprise Print System (CEPS). These systems use the Cisco Discovery Protocol (CDP) to locate the nearest attach point of a Cisco IP phone or printer.

For the purposes of this specification, the term "optimal" is somewhat subjective in that various criteria and locations of individuals and/or conference resources may be considered in determining which resource is optimal or which location is optimal. As described above, the optimal conference room may be the conference room which satisfies any required criterion, and is nearest to each proposed participant. In another embodiment, optimal resources may be selected based upon their availability and/or expense of using such equipment. Thus, the teachings of the present invention may be used to identify which individuals and/or conference resources are available, their respective locations, and the relative expense of relocating the individual and/or the conference resource to a particular location, or the expense of operating a particular conference resource during a conference.

It should be recognized by those of ordinary skill in the art that much of the information that is tracked and/or collected using this technology may be proprietary or confidential information. For example, it may not be prudent to allow all individuals within an organization to track the actual or projected location for all other individuals in the organization. Therefore, it is envisioned that CRS 42 may be programmed with particular "policy" criteria that allows for certain individuals to gain access, while other individuals are prevented from accessing the information available on CRS 42.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A computerized method for identifying conference resources, comprising:
    receiving, at a computerized interface being operable to receive a request for a conference reservation, the request including the identities of a plurality of proposed participants, a proposed start time, and at least one bandwidth-enabled conference resource criterion, the plurality of proposed participants comprising a conference coordinator and at least one conference invitee, the proposed start time comprising a proposed date and a proposed time, wherein the conference resources, including bandwidth-enabled conference resources, are classified as either fixed conference resources or moveable conference resources;
    accessing maintained resource data comprising current location and availability of each of said resources; and
    communicating the request for a conference reservation to a processor, the processor operable to:
        automatically calculate a projected location of the conference coordinator ("conference coordinator projected location") based on presence location information, the conference coordinator projected location comprising a location at which the conference coordinator is expected to be at approximately the proposed start time;
        automatically calculate a projected location of the at least one conference invitee ("conference invitee projected location") based on presence location information, the conference invitee projected location comprising a location remote from the conference coordinator projected location at which the at least one conference invitee is expected to be at approximately the proposed start time;
        select an optimal one of a plurality of bandwidth-enabled conference resources for the conference coordinator ("conference coordinator bandwidth-enabled conference resource") from an inventory of bandwidth-enabled conference resources that are available at the proposed start time that matches the at least one bandwidth-enabled conference resource criterion and the calculated conference coordinator projected location, the inventory of bandwidth-enabled conference resources including fixed conference resources and movable conference resources;
        select an optimal one of a plurality of bandwidth-enabled conference resources for the conference invitee ("conference invitee bandwidth-enabled conference resource") from the inventory of bandwidth-enabled conference resources that are available at the proposed start time that matches the at least one bandwidth-enabled conference resource criterion and the calculated invitee coordinator projected location; and
        determine the amount of bandwidth available between the selected optimal conference coordinator bandwidth-enabled conference resource and the selected optimal conference invitee bandwidth-enabled conference resource based on the bandwidth capacity of said resources to accommodate communications between the conference coordinator and the conference invitee.

2. The method of claim 1, wherein the presence location information is determined from RFID information integrated into a security badge of the conference coordinator or the conference invitee.

3. The method of claim 1, wherein the conference coordinator bandwidth-enabled conference resource comprises the one of the plurality of bandwidth-enabled conference resources that is nearest to the conference coordinator projected location.

4. The method of claim 1, wherein the conference invitee bandwidth-enabled conference resource comprises the one of the plurality of bandwidth-enabled conference resources that is nearest to the conference invitee projected location.

5. A system for identifying conference resources, comprising:
    an interface being operable to:
        receive a request for a conference reservation, the request including the identities of a plurality of proposed participants, a proposed start time, and at least one bandwidth-enabled conference resource criterion, the plurality of proposed participants comprising a conference coordinator and at least one conference invitee, the proposed start time comprising a proposed date and a proposed time, wherein the conference resources, including bandwidth-enabled conference resources, are classified as either fixed conference resources or moveable conference resources; and
    access maintained resource data comprising current location and availability of each of said resources; and
    a processor being operable to:
        automatically calculate a projected location the conference coordinator ("conference coordinator projected location") based on presence location information, the conference coordinator projected location comprising a location at which the conference coordinator is expected to be at approximately the proposed start time;
        automatically calculate a projected location of the at least one conference invitee ("conference invitee projected location") based on presence location information, the conference invitee projected location comprising a location remote from the conference coordinator projected location at which the at least one conference invitee is expected to be at approximately the proposed start time;
        select an optimal one of a plurality of bandwidth-enabled conference resources for the conference coordinator ("conference coordinator bandwidth-enabled conference resource") from an inventory of bandwidth-enabled conference resources that are available at the proposed start time that matches the at least one bandwidth-enabled conference resource criterion and the calculated conference coordinator projected location, the inventory of bandwidth-enabled conference resources including fixed conference resources and movable conference resources;

select an optimal one of a plurality of bandwidth-enabled conference resources for the conference invitee ("conference invitee bandwidth-enabled conference resource") from the inventory of bandwidth-enabled conference resources that are available at the proposed start time that matches the at least one bandwidth-enabled conference resource criterion and the calculated conference invitee projected location; and determine the amount of bandwidth available between the selected optimal conference coordinator bandwidth-enabled conference resource and the selected optimal conference invitee bandwidth-enabled conference resource based on the bandwidth capacity of said resources to accommodate communications between the conference coordinator and the conference invitee.

6. The system of claim 5, wherein the presence location information is determined from RFID information integrated into a security badge of the conference invitee or the conference coordinator.

7. A system for identifying conference resources, comprising:

means for receiving a request for a conference reservation, the request including the identities of a plurality of proposed participants, a proposed start time, and at least one bandwidth-enabled conference resource criterion, the plurality of proposed participants comprising a conference coordinator and at least one conference invitee, the proposed start time comprising a proposed date and a proposed time, wherein the conference resources, including bandwidth-enabled conference resources, are classified as either fixed conference resources or moveable conference resources;

means for accessing maintained resource data comprising current location and availability of each of said resources;

means for automatically calculating a projected location of the conference coordinator ("conference coordinator projected location") based on presence location information, the conference coordinator projected location comprising a location at which the conference coordinator is expected to be at approximately the proposed start time;

means for automatically calculating a projected location of the at least one conference invitee ("conference invitee projected location") based on presence location information, the conference invitee projected location comprising a location remote from the conference coordinator projected location at which the at least one conference invitee is expected to be at approximately the proposed start time;

means select an optimal one of a plurality of bandwidth-enabled conference resources for the conference coordinator ("conference coordinator bandwidth-enabled conference resource") from an inventory of bandwidth-enabled conference resources that are available at the proposed start time that matches the at least one bandwidth-enabled conference resource criterion and the calculated conference coordinator projected location, the inventory of bandwidth-enabled conference resources including fixed conference resources and movable conference resources;

means select an optimal one of a plurality of bandwidth-enabled conference resources for the conference invitee ("conference invitee bandwidth-enabled conference resource") from an inventory of bandwidth-enabled conference resources that are available at the proposed start time that matches the at least one bandwidth-enabled conference resource criterion and the calculated conference invitee projected location; and means for determining the amount of bandwidth available between the selected optimal conference coordinator bandwidth-enabled conference resource and the selected optimal conference invitee bandwidth-enabled conference resource based on the bandwidth capacity of said resources to accommodate communications between the conference coordinator and the conference invitee.

8. The system of claim 7, wherein the presence location information is determined from RFID information integrated into a security badge of the conference invitee or the conference coordinator.

9. An apparatus comprising:

a computer readable medium having stored logic such that when executed by a processor is operable to:

receive a request for a conference reservation, the request including the identities of a plurality of proposed participants, a proposed start time, and at least one bandwidth-enabled conference resource criterion, the plurality of proposed participants comprising a conference coordinator and at least one conference invitee, the proposed start time comprising a proposed date and a proposed time, wherein the conference resources, including bandwidth-enabled conference resources, are classified as either fixed conference resources or moveable conference resources;

access maintained resource data comprising current location and availability of each of said resources;

automatically calculate a projected location the conference coordinator ("conference coordinator projected location") based on presence location information, the conference coordinator projected location comprising a location at which the conference coordinator is expected to be at approximately the proposed start time;

automatically calculate a projected location of the at least one conference invitee ("conference invitee projected location") based on presence location information, the conference invitee projected location comprising a location remote from the conference coordinator projected location at which the at least one conference invitee is expected to be at approximately the proposed start time;

select an optimal one of a plurality of bandwidth-enabled conference resources for the conference coordinator ("conference coordinator bandwidth-enabled conference resource") from an inventory of bandwidth-enabled conference resources that are available at the proposed start time that matches the at least one bandwidth-enabled conference resource criterion and the calculated conference coordinator projected location, the inventory of bandwidth-enabled conference resources including fixed conference resources and movable conference resources;

select an optimal one of a plurality of bandwidth-enabled conference resources for the conference invitee ("conference invitee bandwidth-enabled conference resource") from the inventory of bandwidth-enabled conference resources that are available at the proposed start time that matches the at least one bandwidth-enabled conference resource criterion and the calculated conference invitee projected location; and determine the amount of bandwidth available between the selected optimal conference coordinator bandwidth-enabled conference resource and the selected optimal conference invitee bandwidth-enabled conference resource based on the bandwidth capacity of said resources to accommodate communications between the conference coordinator and the conference invitee.

10. The apparatus of claim 9,
wherein the presence location information is determined from RFID information integrated into a security badge of the conference invitee or the conference coordinator.

11. The system of claim 5, wherein the conference coordinator bandwidth-enabled conference resource comprises the one of the plurality of bandwidth-enabled conference resources that is nearest to the conference coordinator projected location or nearest to the conference invitee projected location.

12. The system of claim 5, wherein the conference invitee bandwidth-enabled conference resource comprises the one of the plurality of bandwidth-enabled conference resources that is nearest to the conference invitee projected location.

13. The system of claim 7, wherein the conference coordinator bandwidth-enabled conference resource comprises the one of the plurality of bandwidth-enabled conference resources that is nearest to the conference coordinator projected location or nearest to the conference invitee projected location.

14. The system of claim 7, wherein the conference invitee bandwidth-enabled conference resource comprises the one of the plurality of bandwidth-enabled conference resources that is nearest to the conference invitee projected location.

15. The apparatus of claim 9, wherein the conference coordinator bandwidth-enabled conference resource comprises the one of the plurality of bandwidth-enabled conference resources that is nearest to the conference coordinator projected location or nearest to the conference invitee projected location.

16. The apparatus of claim 9, wherein the conference invitee bandwidth-enabled conference resource comprises the one of the plurality of bandwidth-enabled conference resources that is nearest to the conference invitee projected location.

17. The method of claim 1, the plurality of bandwidth-enabled conference resources being selected from the group consisting of: telephones, computers running telephony software, video monitors, cameras, IP phones, cell phones.

18. The system of claim 5, the plurality of bandwidth-enabled conference resources being selected from the group consisting of: telephones, computers running telephony software, video monitors, cameras, IP phones, cell phones.

19. The system of claim 7, the plurality of bandwidth-enabled conference resources being selected from the group consisting of: telephones, computers running telephony software, video monitors, cameras, IP phones, cell phones.

20. The apparatus of claim 9, the plurality of bandwidth-enabled conference resources being selected from the group consisting of: telephones, computers running telephony software, video monitors, cameras, IP phones, cell phones.

21. The method of claim 1, wherein the fixed conference resources comprise conference rooms.

22. The system of claim 5, wherein the fixed conference resources comprise conference rooms.

23. The system of claim 7, wherein the fixed conference resources comprise conference rooms.

24. The apparatus of claim 9, wherein the fixed conference resources comprise conference rooms.

25. The method of claim 1, wherein the presence location information comprises projected schedule information of the conference coordinator or the conference invitee.

26. The system of claim 5, wherein the presence location information comprises projected schedule information of the conference coordinator or the conference invitee.

27. The system of claim 7, wherein the presence location information comprises projected schedule information of the conference coordinator or the conference invitee.

28. The apparatus of claim 9, wherein the presence location information comprises projected schedule information of the conference coordinator or the conference invitee.

29. The method of claim 1, wherein the presence location information is collected from a mobile, cellular, or IP phone or personal computer of the conference coordinator or the conference invitee.

30. The system of claim 5, wherein the presence location information is collected from a mobile, cellular, or IP phone or personal computer of the conference coordinator or the conference invitee.

31. The system of claim 7, wherein the presence location information is collected from a mobile, cellular, or IP phone or personal computer of the conference coordinator or the conference invitee.

32. The apparatus of claim 9, wherein the presence location information is collected from a mobile, cellular, or IP phone or personal computer of the conference coordinator or the conference invitee.

33. The method of claim 1, wherein the presence location information compromises information regarding electronic equipment that was last used by the conference coordinator or the conference invitee.

34. The system of claim 5, wherein the presence location information compromises information regarding electronic equipment that was last used by the conference coordinator or the conference invitee.

35. The system of claim 7, wherein the presence location information compromises information regarding electronic equipment that was last used by the conference coordinator or the conference invitee.

36. The apparatus of claim 9, wherein the presence location information compromises information regarding electronic equipment that was last used by the conference coordinator or the conference invitee.

37. The method of claim 1, wherein the presence location information comprises a status indicator published by the conference coordinator or the conference invitee.

38. The system of claim 5, wherein the presence location information comprises a status indicator published by the conference coordinator or the conference invitee.

39. The system of claim 7, wherein the presence location information comprises a status indicator published by the conference coordinator or the conference invitee.

40. The apparatus of claim 9, wherein the presence location information comprises a status indicator published by the conference coordinator or the conference invitee.

* * * * *